US010698415B2

(12) United States Patent
Indrakanti et al.

(10) Patent No.: US 10,698,415 B2
(45) Date of Patent: Jun. 30, 2020

(54) VEHICLE ASSIST SYSTEM

(71) Applicant: TRW AUTOMOTIVE U.S. LLC, Livonia, MI (US)

(72) Inventors: Ramakirankumar Indrakanti, Farmington Hills, MI (US); Hassan Elkhatib, Farmington Hills, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 0 days.

(21) Appl. No.: 16/176,615

(22) Filed: Oct. 31, 2018

(65) Prior Publication Data

US 2020/0133295 A1  Apr. 30, 2020

(51) Int. Cl.
*G05D 1/02* (2020.01)
*H04N 5/247* (2006.01)
(Continued)

(52) U.S. Cl.
CPC .............. *G05D 1/0246* (2013.01); *B60T 7/12* (2013.01); *B60W 30/09* (2013.01); *B60W 30/12* (2013.01); *G05D 1/0212* (2013.01); *G06K 9/6288* (2013.01); *G06T 7/0002* (2013.01); *H04N 5/247* (2013.01); *B60W 2420/42* (2013.01); *B60W 2550/20* (2013.01); *B60W 2554/00* (2020.02); *B60W 2555/20* (2020.02); *B60W 2710/18* (2013.01); *B60W 2720/10* (2013.01); *B60W 2720/24* (2013.01); *G05D 2201/0213* (2013.01); *G06K 9/00798* (2013.01);
(Continued)

(58) Field of Classification Search
CPC ............... G05D 1/0246; G05D 1/0212; G05D 2201/0213; B60T 7/12; B60W 30/09; B60W 30/12; B60W 2420/42; B60W 2550/10; B60W 2550/12; B60W 2550/20; B60W 2710/18; B60W 2720/10; B60W 2720/24; G06K 9/6288; G06K 9/00798; G06K 9/00805; G06K 9/00818; G06K 9/00825; G06T 7/0002; G06T 2207/10048; G06T 2207/20221; G06T 2207/30168; G06T 2207/230192; G06T 2207/30252; H04N 5/247
USPC .......................................................... 701/28
See application file for complete search history.

(56) References Cited

U.S. PATENT DOCUMENTS 6,151,539 A    11/2000  Bergholz et al.
7,199,366 B2    4/2007  Hahn et al.
(Continued)

OTHER PUBLICATIONS

Reuters Online Article: Israeli Start-Up Building Thermal Cameras for Self-Driving Cars, accessed Dec. 1, 2017, p. 1-3.
(Continued)

*Primary Examiner* — Marthe Y Marc-Coleman
(74) *Attorney, Agent, or Firm* — Tarolli, Sundheim, Covell & Tummino LLP

(57) ABSTRACT

A method for assisting operation of a vehicle traveling on a roadway includes acquiring visual images around the vehicle with at least one visual camera having a field of view and acquiring thermal images around the vehicle with at least one thermal camera having the field of view. The thermal images are superimposed over the visual images to produce composite images. An object is detected in the composite images. A vehicle assist system adjusts at least one of a direction of travel and speed of the vehicle in response to detecting the object.

8 Claims, 11 Drawing Sheets

(51) Int. Cl.
    *G06K 9/62*     (2006.01)
    *B60W 30/12*     (2020.01)
    *B60W 30/09*     (2012.01)
    *B60T 7/12*     (2006.01)
    *B60T 7/00*     (2006.01)
    *G06T 7/00*     (2017.01)
    *G06K 9/00*     (2006.01)

(52) U.S. Cl.
    CPC ..... *G06K 9/00805* (2013.01); *G06K 9/00818* (2013.01); *G06K 9/00825* (2013.01); *G06T 2207/10048* (2013.01); *G06T 2207/20221* (2013.01); *G06T 2207/30168* (2013.01); *G06T 2207/30192* (2013.01); *G06T 2207/30252* (2013.01)

(56) References Cited

U.S. PATENT DOCUMENTS

| | | | |
|---|---|---|---|
| 8,755,597 B1* | 6/2014 | Tantalo | G06K 9/2018 |
| | | | 382/162 |
| 2010/0191418 A1* | 7/2010 | Mimeault | B60Q 1/0023 |
| | | | 701/36 |
| 2014/0368646 A1* | 12/2014 | Traff | H04N 5/33 |
| | | | 348/143 |
| 2015/0210216 A1* | 7/2015 | Reichel | B60W 30/085 |
| | | | 701/48 |
| 2016/0216245 A1* | 7/2016 | Sutton | G01N 33/0098 |
| 2018/0089972 A1* | 3/2018 | Gabel | H04N 5/332 |
| 2019/0294897 A1* | 9/2019 | Cohen | G06K 9/00825 |

OTHER PUBLICATIONS

Flir Online Article: Thermal Imaging in Advanced Driver Assist Systems (ADAS); last accessed Oct. 29, 2018, p. 1-4.

* cited by examiner

VEHICLE ASSIST SYSTEM

TECHNICAL FIELD

The present invention relates generally to vehicle systems and, more specifically, relates to a vehicle assist system having imaging elements that account for changes in visibility around the vehicle.

BACKGROUND

Current driver assistance systems (ADAS—advanced driver assistance system) offer a series of monitoring functions in vehicles. In particular, the ADAS can monitor the environment around the vehicle and notify the driver of the vehicle of conditions therein. To this end, the ADAS can capture images of the surrounding environment and digitally process the images to extract information. The information is used to warn the driver of road obstacles located along the driving path. A common ADAS includes automatic emergency braking to help prevent rear-end collision and lane detection to help maintain the vehicle within the intended driving lane.

SUMMARY

In one aspect of the present invention, a method for assisting operation of a vehicle traveling on a roadway includes acquiring visual images around the vehicle with at least one visual camera having a field of view and acquiring thermal images around the vehicle with at least one thermal camera having the field of view. The thermal images are superimposed over the visual images to produce composite images. An object is detected in the composite images. A vehicle assist system adjusts at least one of a direction of travel and speed of the vehicle in response to detecting the object.

In another aspect, a vehicle assist system for a host vehicle traveling on a roadway includes a visual camera for acquiring visual images around the host vehicle in a field of view. A thermal camera acquires thermal images around the host vehicle in the field of view. A rain sensor detects precipitation within the field of view. A controller is connected to the visual camera, the thermal camera, and the rain sensor. The controller superimposes the thermal images onto the visual images to form composite images for detecting objects within the field of view. The controller adjusts at least one of a direction of travel and speed of the vehicle in response to detecting the object.

Other objects and advantages and a fuller understanding of the invention will be had from the following detailed description and the accompanying drawings.

DETAILED DESCRIPTION

Figure 1:
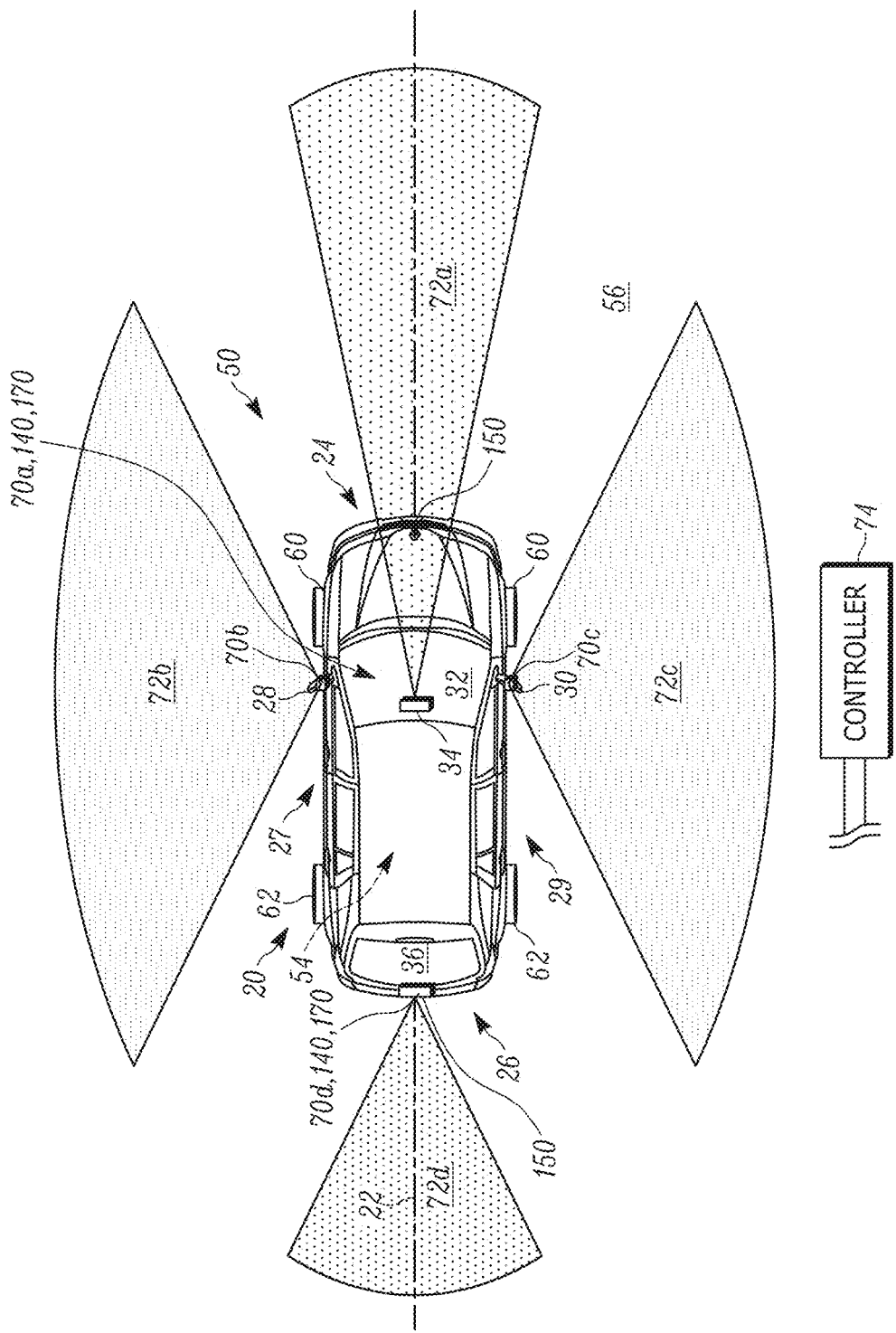
FIG. 1 is a top view of a vehicle having an assist system in accordance with an embodiment of the present invention.

The present invention relates generally to vehicle systems and, more specifically, relates to a vehicle assist system having imaging elements that account for changes in visibility around the vehicle. FIG. 1 illustrates a vehicle 20 having an example assist system 50 in accordance with the present invention.

The vehicle 20 extends along a centerline 22 from a front end 24 to a rear end 26. The vehicle 20 includes a left side 27 and a right side 29 positioned on opposite sides of the centerline 22. A side view mirror 28 is connected to the left side 27. Another side view mirror 30 is connected to the right side 29.

The front end 24 of the vehicle 20 includes a front window or windshield 32 extending generally between the left and right sides 27, 29. A rear view mirror 34 is secured to the windshield 32. The rear end 26 of the vehicle 20 includes a rear window 36 extending generally between the left and right sides 27, 29. The vehicle 20 includes an interior 54. The exterior of the vehicle 20 is indicated generally at 56.

The vehicle 20 includes a pair of front steerable wheels 60 and a pair of rear wheels 62. The front wheels 60 are mechanically linked to a steering actuator or gear 68 (see FIG. 2), which is mechanically linked to a steering wheel 66. Alternatively, the front wheels 62 and steering wheel 66 could be part of a steer-by-wire system (not shown). The rear wheels 62 could also be coupled to the steering wheel 66 by the same steering gear 68 or another steering gear (not shown).

In any case, rotation of the steering wheel 66 actuates the steering gear 68 to turn the wheels 60 relative to the centerline 22 in order to steer the vehicle 20. To this end, the steering wheel 66 has a neutral position in which the wheels 60 point in directions that are parallel to the centerline 22 such that the vehicle moves in a straight line. Counterclockwise rotation of the steering wheel 66 angles the wheels 60 leftward relative to the centerline 22 (as shown in FIG. 1), causing the vehicle 20 to turn left. Clockwise rotation of the steering wheel 66 angles the wheels 60 rightward relative to the centerline 22, causing the vehicle 20 to turn right.

The assist system 50 includes imaging elements 70a-70d provided around the vehicle 20. In one example, the imaging element 70a is secured to the rear view mirror 34. The imaging element 70b is secured to the left side 27 on the side view mirror 28. The imaging element 70c is secured to the right side 29 on the side view mirror 30. The imaging element 70d is secured to the rear end 26 of the vehicle 20 along or adjacent to the centerline 22.

All the imaging elements 70a-70d face outward away from the vehicle 20. Accordingly, the imaging element 70a is front- or forward-facing. The imaging element 70d is back- or rearward-facing. The imaging elements 70b, 70c are side- or lateral-facing. It will be appreciated that more or fewer imaging elements can be provided. In any case, all of the imaging elements 70a-70d are electrically or wirelessly connected to a controller 74 in the vehicle 20.

Each imaging element 70a-70d has an associated field of view 72a-72d covering a portion of the vehicle exterior 56. Collectively, the fields of view 72a-72d substantially encircle the entire vehicle 20 and can be discrete from one another (as shown) or overlap one another (not shown). The controller 74 continuously receives images taken by one or more of the imaging elements 70a-70d within the respective fields of view 72a-72d. The controller 74 includes an image processing module (not shown) that receives and analyzes the data associated with the images from the imaging elements 70a-70d. The controller 74 can, for example, stitch the images together to form a 360° surround view (not shown) of the vehicle exterior 56. The images can be relied on to identify objects around the vehicle 20. In some instances, less than all of the imaging elements 70a-70d are used to detect objects around the vehicle 20 and/or assist the operator.

Figure 2:
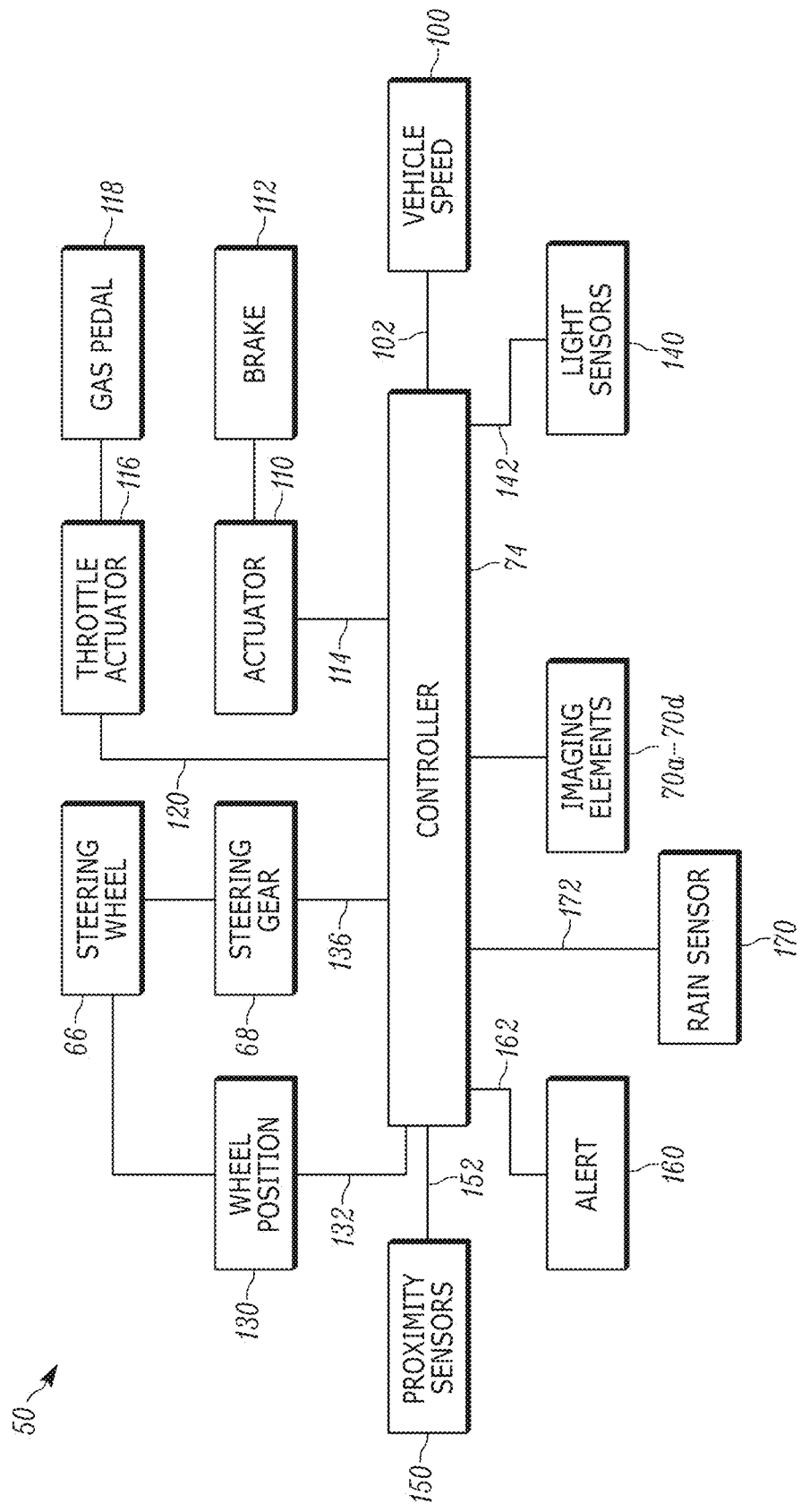
FIG. 2 is a schematic illustration of the assist system of FIG. 1.

Referring to FIG. 2, the controller 74 is also electrically or wirelessly connected to various sensors and actuators in the vehicle 20 for monitoring and controlling several functions of the vehicle, namely, vehicle speed and steering. To this end, the controller 74 is electrically or wirelessly connected to a vehicle speed sensor 100. The speed sensor 100 monitors the vehicle speed and generates an electrical signal 102 indicative thereof that is sent to the controller 74 at predetermined time intervals.

The controller 74 is also electrically or wirelessly connected to an actuator 110 associated with the vehicle brake 112 and a throttle actuator 116 associated with the gas pedal 118. The controller 74 can send a control signal 114 to the brake actuator 110 to decrease the vehicle 20 speed. The controller 74 can send a control signal 120 to the throttle actuator 116 to increase the vehicle 20 speed.

A wheel position sensor 130 monitors the rotational angle of the steering wheel 66 and generates an electrical signal 132 indicative of the steering angle. The signal 132 is sent to the controller 74 at predetermined time intervals. The controller 74 can send a control signal 136 to the steering gear 68 in response to the wheel position signal 132, thereby controlling rotation of the steering wheel 66. The steering gear 68 actuation also controls the steering angle of the front wheels 60 relative to the centerline 22 of the vehicle 20.

At least one light sensor 140 is electrically or wirelessly connected to the controller 74 for acquiring data related to light intensity around the vehicle exterior 56. One light sensor 140 is secured to the rear view mirror 34 and has a detection range substantially encompassing the field of view 72a of the imaging element 70a. A light sensor 140 secured to the rear end 26 has a detection range that encompasses the field of view 72d of the imaging element 70d. Light sensors 140 are secured to the left and right sides 27, 29 of the vehicle 20 and have respective detection ranges encompassing the fields of view 72c-72d. The light sensors 140 detect the presence and intensity of light in the fields of view 72a-72d of the imaging elements 70a-70d. This would include, for example, light directly from the sun; sunlight reflected off a roadway, other vehicles, buildings, etc.; and light from headlights of oncoming vehicles. The light sensors 140 send signals 142 to the controller 74 indicative of the light intensity within the fields of view 72a-72d.

At least one proximity sensor 150 can be electrically or wirelessly connected to the controller 74 for acquiring data related to objects around the vehicle exterior 56. The at least one proximity sensor 150 can include, for example, laser scanners, ultrasonic sensors, radar detectors, and LIDAR detectors, for determining and monitoring the distance between the vehicle 20 and objects around the vehicle exterior 56 detected by the imaging elements 70a-70d. In one example, proximity sensors 150 are provided on the front end 24 and rear end 26 of the vehicle 20. The proximity sensors 150 can, however, be omitted entirely.

At least one rain sensor 170 can be electrically or wirelessly connected to the controller 74 for acquiring data related to precipitation around the vehicle exterior 56. As shown, rain sensors 170 are provided on the front end 24 and rear end 26 of the vehicle 20. The rain sensors 170 detect whether precipitation—such as rain, snow, hail or fog—is present within the fields of view 72a, 72d and, when present, the intensity of the precipitation, e.g., mm/hr or in/hr. The rain sensors 170 send signals 172 indicative of precipitation within the fields of view 72a, 72d to the controller 74.

Based on this construction, the controller 74 is capable of receiving continuous feedback regarding the driving conditions of the vehicle, e.g., vehicle speed and steering angle, images around the vehicle exterior 56, weather and light conditions around the vehicle, and the distance between the vehicle and objects identified in the images. The controller 74, in response to these inputs, is capable of controlling vehicle operation in a manner that helps increase occupant safety. To this end, the controller 74 can assist with or perform lane keep assistance, emergency braking, and backup assistance in response to images sent by the imaging elements 70a-70d.

An alert 160 is electrically or wirelessly connected to the controller 74 for providing feedback to the operator of the vehicle 20 before and/or while autonomous operations are performed by the assist system 50. The alert 160 provides visual, audio or haptic feedback to the operator before and/or when the controller 74 sends a signal 142 thereto.

Figure 3A:
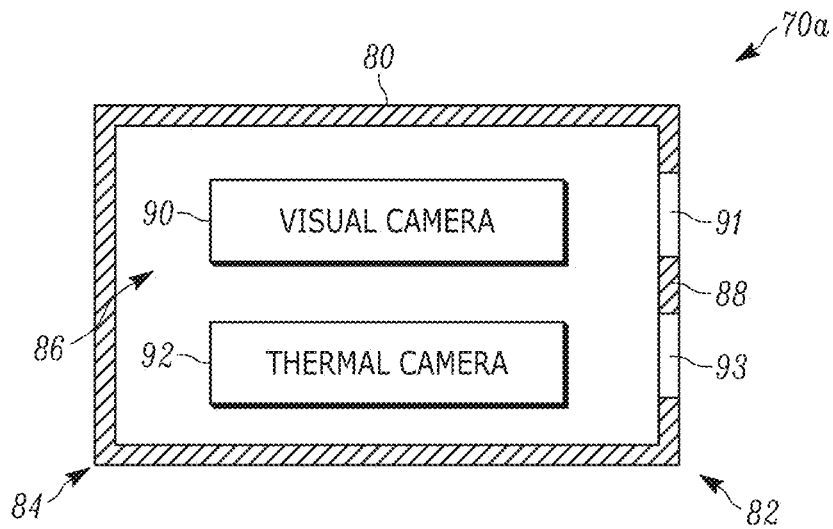
FIG. 3A is a schematic illustration of an example imaging element of the assist system of FIG. 1.

Referring to FIG. 3A, one example imaging element 70a includes a housing 80 extending from a first end 82 to a second end 84 and defining an interior 86. The first end 82 is closed by an end wall 88. A visual camera 90 and separate thermal camera 92 are provided in the interior 86. Each camera 90, 92 has an associated lens 91, 93 provided in the end wall 88 such that the cameras have substantially the same field of view 72a extending through the end wall forward of the vehicle 20. The visual camera 90 can be a single lens camera or multi-focal camera.

Since the visual camera 90 relies on capturing light to generate images, the visual camera is better suited than the thermal camera 92 for detecting inanimate objects, e.g., lane lines, parked vehicles, stop signs, debris in the roadway, etc. On the other hand, the thermal camera 92 relies on detecting heat to generate images and, thus, the thermal camera is better suited than the visual camera 90 for detecting living objects, e.g., pedestrians or animals, or objects that generate more heat relative to their surroundings, e.g., vehicle exhaust pipes.

Figure 3B:
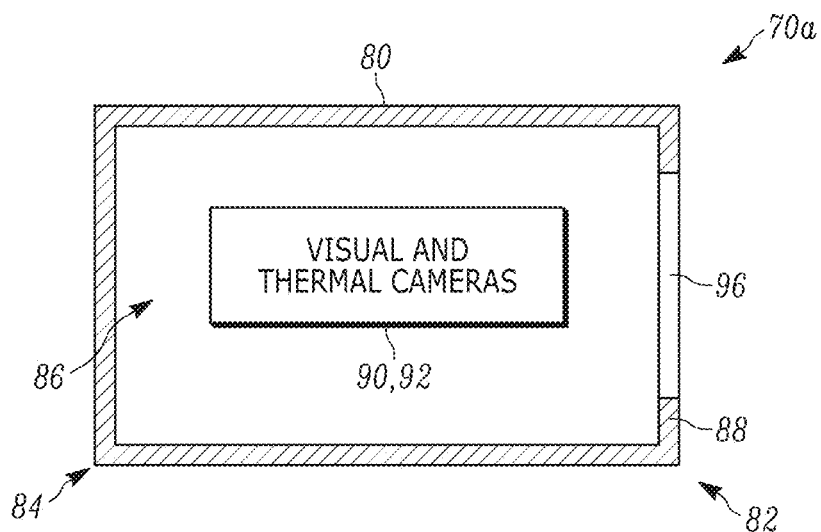
FIG. 3B is a schematic illustration of another example imaging element of the assist system of FIG. 1.

In an alternative configuration shown in FIG. 3B, the visual camera 92 and thermal camera 94 are integrated with one another—with both using the same lens 96 provided in the end wall 88 to share the same field of view 72a. In any case, the imaging element 70a can have a single lens or multi-lens configuration. It will be appreciated that the imaging elements 70b-70d can each have the same construction as the imaging element 70a in either FIG. 3A or 3B.

Figure 4:
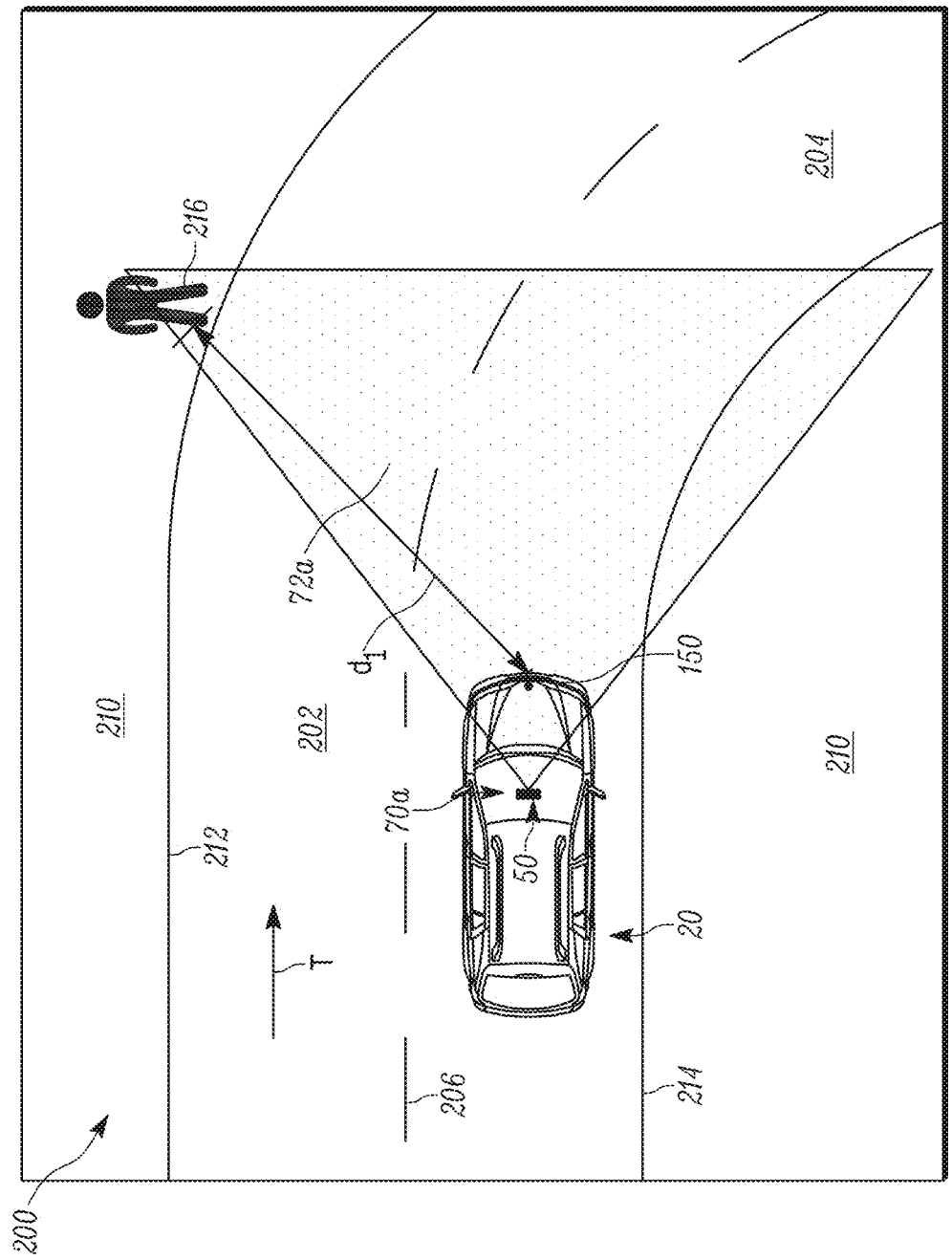
FIG. 4 is a schematic illustration of the vehicle traveling on a roadway and detecting an object in front of the vehicle within a field of view.

In one example, the assist system 50 detects objects within the field of view 72a and chooses the proper response, if any, to detection of those objects. To this end, an example roadway 200 is shown in FIG. 4 and has a direction of vehicle travel illustrated by the arrow T. The roadway 200 includes a series of lanes 202, 204 separated by a dashed dividing line 206. Additional lanes and dividing lines are contemplated but not shown. The roadway 200 is defined from the surrounding off-road terrain 210 by a boundary line 212 on the left side (relative to the traveling direction T) and by a boundary line 214 on the right side.

Referring to FIG. 4, as the vehicle 20 travels down the road 200, the imaging element 70a detects objects in front of the vehicle within the field of view 72a, e.g., other vehicles, pedestrians, animals, debris, etc. One example object is represented as the pedestrian 216 in FIG. 4. More specifically, the controller 74 continuously receives signals representing visual images from the visual camera 90 and signals representing thermal images from the thermal camera 92.

Figure 5A:
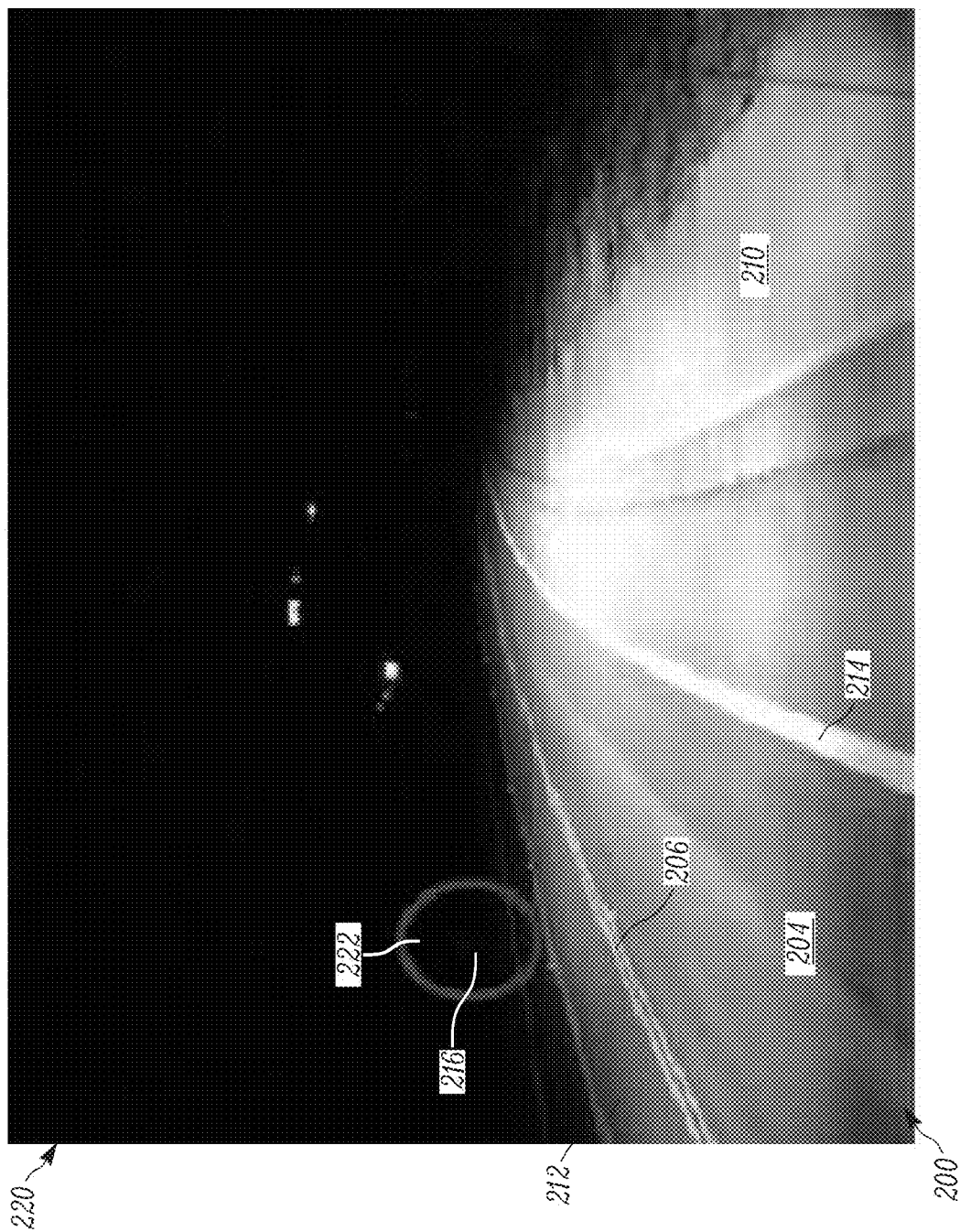
FIG. 5A is a visual image of the field of view.

An example visual image 220 is shown in FIG. 5A. In the image 220, the lines 206, 212, 214 of the roadway 200 are visible. An indicator 222 approximates the location of what the controller 74 believes is the object 216 (here a pedestrian on the off-road terrain 210). Placement of the indicator 222 can be based on neural network shape detection analysis by segmentation of the visual image 220. The controller 74 can perform a pixel analysis within the indicator 222 and determine a first confidence score indicative of the likelihood the object 216 in the indicator is in fact what the controller assesses it to be.

Figure 5B:
FIG. 5B is a thermal image of the field of view.

An example thermal image 230 is shown in FIG. 5B. In the image 230, the lines 206, 212, 214 of the roadway 200 are less visible and harder to detect compared to the visual image 220. An indicator 232 approximates the location of what the controller 74 believes is the object 216. Placement of the indicator 232 can be based on a fuzzy system shape detection analysis in relative hot spots within the visual image 220. The controller 74 can perform a pixel analysis within the indicator 232 and determine a second confidence score indicative of the likelihood the object 216 in the indicator is in fact what the controller assesses it to be. The object 216 is more visible and easier to detect in the thermal image 230 compared to the visual image 220 and, thus, the second confidence score is greater than the first confidence score.

In order to take advantage of each camera's 90, 92 detection capability, the controller 74 superimposes or overlies the visual images 220 and thermal images 230 on one another to form composite images 240 (FIG. 5C). This allows the controller 74 to take advantage of the capabilities of both cameras 90, 92 to increase the reliability of the assist system 50 to detect objects around the vehicle 20.

Weather and lighting conditions around the vehicle, however, can affect the ability of the visual camera 90 to detect objects within the field of view 72a. The controller 74 therefore relies on one or more of the sensors 140, 170 to detect and monitor the weather and lighting conditions around the vehicle 20. The absence of any adverse weather or adverse lighting conditions is presumed by the controller 74 to equate with high visual camera 90 visibility within the field of view 72a. On the other hand, the indication of adverse weather and/or adverse lighting conditions is presumed by the controller 74 to equate with low visual camera 90 visibility within the field of view 72a. In response to such indications (or lack thereof), the controller 74 adjusts the transparency of the thermal image 230 before superimposing the thermal image over the visual image 220.

In one example, the transparency of the thermal image 230 is increased if the detected light intensity is within a predetermined range coinciding with what is deemed to be normal light conditions. The transparency of the thermal image 230 is decreased if the detected light intensity is either below the predetermined range (deemed too dark) or above the predetermined range (deemed too bright). The more extreme the light intensity (or lack thereof) the less transparent the thermal image 230 is made.

Along the same lines, the transparency of the thermal image 230 is increased if no precipitation is detected or the detected precipitation is at or below a predetermined amount. The transparency of the thermal image 230 is decreased if precipitation is detected or the detected precipitation is above the predetermined amount. The greater the sensed precipitation the less transparent the thermal image 230 is made.

The controller 74 receives the signals 142, 172 from the sensors 140, 170 and determines based on algorithms an aggregate visibility score, e.g., 0-100%, for the visual image 220. In one example, the controller 74 assigns first and second visibility scores to each sensed weather and lighting condition around the vehicle 20 based on a look-up table listing possible weather and lighting conditions and their individual, corresponding visibility score. The first and second visibility scores can then be weighed and averaged to determine the aggregate visibility score. Certain weather or lighting conditions are weighed more heavily than others based on their known affect on visual image visibility.

Figure 6:
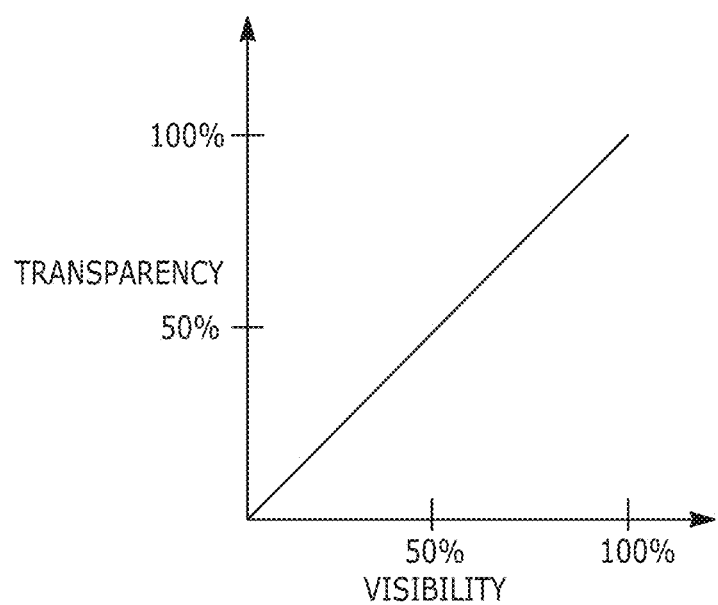
FIG. 6 is a graph illustrating the correlation between visibility within the field of view and the transparency of the thermal image.

The controller 74 adjusts the transparency of the thermal image 230 once the aggregate visibility score is established. The greater the aggregate visibility score the greater the transparency of the thermal image 230. The lower the aggregate visibility score the lower the transparency of the thermal image 230. In other words, the degree of visibility in the visual image 220 is directly related to the degree to which the thermal image 230 is made transparent. This relationship is shown in FIG. 6.

Figure 7A:
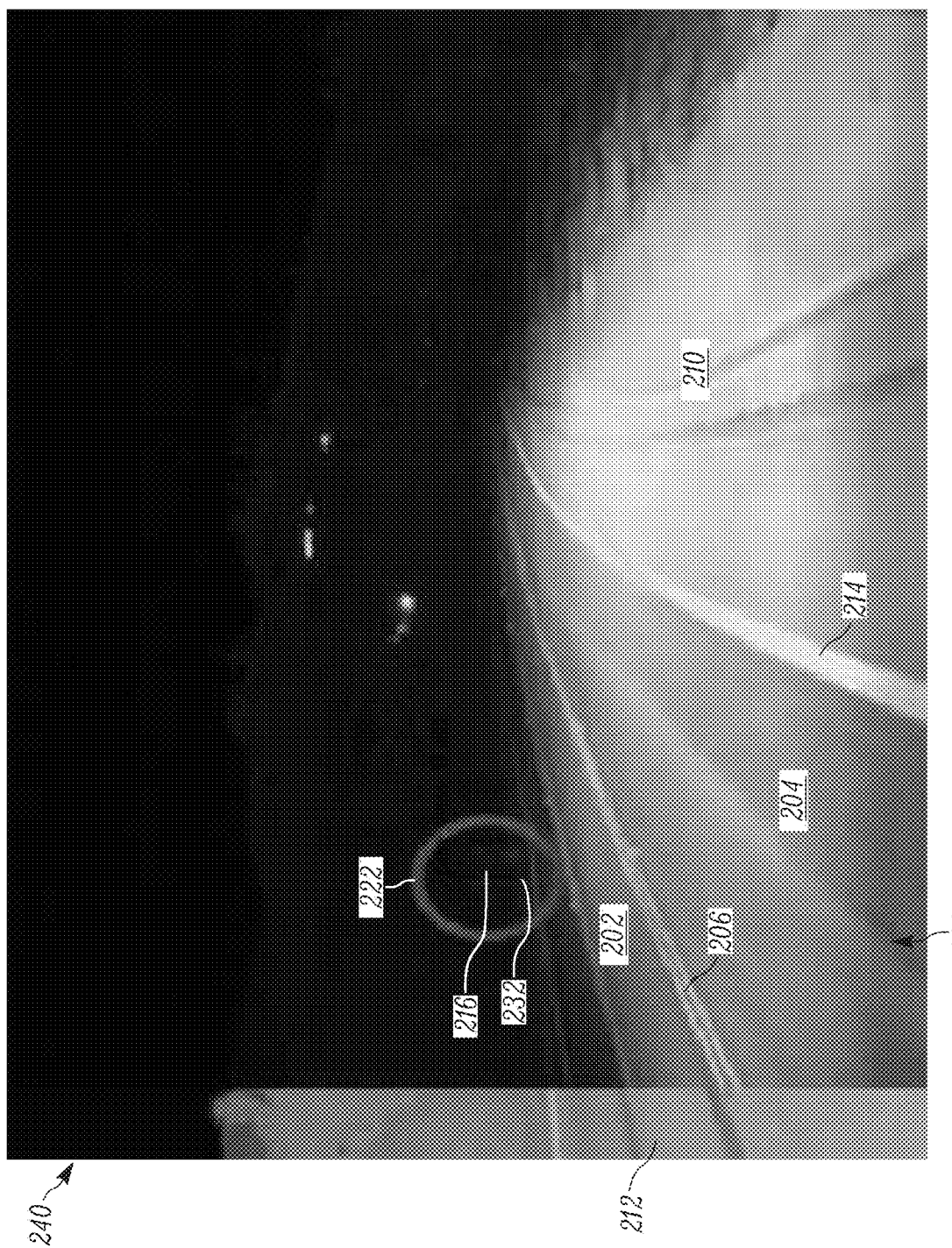
FIG. 7A is a composite image of the thermal image having a first transparency and superimposed over the visual image.
Figure 7B:
FIG. 7B is a composite image of the thermal image having a second transparency and superimposed over the visual image.

FIGS. 7A and 7B show composite images 240 with different degrees of thermal image 230 transparency. In FIG. 7A, the aggregate visibility score of the visual image 220 is 75% and, thus, the thermal image 230 has a transparency of 25%. This corresponds with relatively high visibility in the visual image 220 and, thus, the controller 74 relies relatively less on the thermal image 230 to detect the object 216 and lines 206, 212, 214. In FIG. 7B, the aggregate visibility score of the visual image 220 is 55% and, thus, the thermal image 230 has a transparency of 45%. This corresponds with relatively lower visibility in the visual image 220 and, thus, the controller 74 relies more on the thermal image 230 to detect the object 216 and lines 206, 212, 214.

In each case, objects 216 and lines 206, 212, 214 in the composite image 240 are easier to detect compared to relying on just the visual image 220 or just the thermal image 230. In the composite image 240, the lane lines 206, 214 in each image 220, 230 overlay one another. The indicators 222, 232 overlay one another. The controller 74 can perform a pixel analysis within the overlaid indicators 222, 232 and determine a third confidence score indicative of the likelihood the object 216 in the indicators is in fact what the controller assesses it to be. The third confidence score is greater than the first and second confidence scores. It will be appreciated that the controller 74 can adjust the first, second, and/or third confidence scores based on the sensed weather and lighting conditions around the vehicle 20, e.g., the confidence scores decrease as the weather conditions worsen and/or when the lighting is poor.

Once the object 216 is detected in the composite image 240, the controller 74 relies on the proximity sensor 130 to monitor the distance between the vehicle 20 and the object. The controller 74, in response to detecting the object 216, is configured to adjust the speed of the vehicle 20, when desired. In one example, if the controller 74 determines that the object 216 is within a predetermined distance $d_1$ (FIG. 4), the controller initiates emergency braking by sending a control signal 114 to the brake actuator 110 to decrease the vehicle 20 speed. The combination of the vehicle 20 speed and the distance to the object can result in the controller 74 bringing the vehicle to a complete stop. This can occur, for example, when the object 216 is in front of the vehicle 20 and within the lane 204 (not shown).

The controller 74 can take into consideration the first and second confidence scores and/or the third confidence score before initiating emergency braking. For instance, no emergency braking occurs until/unless the confidence score(s) taken into consideration exceed predetermined values.

It will be appreciated that the distance $d_1$ can be detected and monitored in each image 220, 230, 240. Based on the vehicle speed signal 102, the controller 74 can determine the time-to-collision with the object 216. The time-to-collision calculated from the visual image 220, thermal image 230 and/or composite image 240 can be taken into account when the controller 74 decides whether to initiate emergency braking. A confidence value can be assigned to the time-to-collision determination and can be adjusted based on sensed weather and/or lighting conditions.

Although the object 216 is shown as a pedestrian, the object could likewise be another vehicle within the lane 204 either in front of the vehicle 20 (when the vehicle is traveling in the direction T) or behind the vehicle (when the vehicle is backing up). In the latter case, the controller 74 relies on the imaging element 70d and sensors 140, 170 on the rear end 26 of the vehicle 20 to identify an object in the field of view 72d. In any case, the other vehicle could be moving or stationary. In other words, the composite images 240 can be generated in either forward or reverse vehicle 20 travel to detect moving or stationary objects in either field of view 72a, 72d. Any of the confidence scores and/or time-to-collision determinations can be used by the controller 74 to determine whether to initiate emergency braking in these scenarios.

At the same time, the proximity sensors 150 are used in combination with the imaging element 70a to allow the controller 74 to provide lane keep assistance. As the vehicle 20 travels in the direction T, the controller 74 relies on the composite image 240 and the proximity sensors 150 to monitor the distance between the vehicle 20 and each line 206, 214. The controller 74, in response to detecting the object 216, is configured to adjust the direction of travel T of the vehicle 20, when desired.

For instance, the wheel position sensor 130 continuously supplies signals 132 to the controller 74. As a result, the controller 74 can analyze the composite images 240 and the signals 152 from the proximity sensors 150 and provide autonomous lane keep assistance. In particular, the controller 74 can actuate the steering gear 68 to prevent the vehicle 20 from inadvertently drifting over the dividing line 206 into the lane 202. This can occur, for example, if the operator of the vehicle 20 is distracted, tired, etc.

If, for example, the proximity sensor 150 detects that the vehicle 20 is within a predetermined distance from the dividing line 206, the controller 74 actuates the steering gear 68 to rotate the steering wheel 66 clockwise from the neutral position. This pivots the wheels 60 and causes the vehicle 20 to move laterally towards the boundary line 214. Once the proximity sensor 150 indicates that the vehicle 20 is spaced a desired distance from both lines 206, 214 the controller 74 returns the steering wheel 66 to the neutral position such that the vehicle 20 travels in a straight line in the lane 204 in the direction T.

Similarly, if the proximity sensor 150 detects that the vehicle 20 is within a predetermined distance from the boundary line 214, the controller 74 actuates the steering gear 68 to rotate the steering wheel 68 counterclockwise from the neutral position. This pivots the wheels 60 and causes the vehicle 20 to move laterally towards the dividing line 206. Once the proximity sensor 150 indicates that the vehicle 20 is spaced a desired distance from both lines 206, 214 the controller 74 returns the steering wheel 66 to the neutral position such that the vehicle 20 travels in a straight line in the lane 204 in the direction T. In both instances, the controller 74 sends a signal 162 to the alert 160 to provide feedback to the operator before and/or while the autonomous steering correction is made to maintain the vehicle 20 between the lines 206, 214.

It will be appreciated that the controller 74 can also be configured such that once an object is detected, the controller can track and/or classify the object to better determine when the direction of travel T and/or speed needs to be adjusted. To this end, the controller 74 can use a tracking algorithm that continuously monitors the distance $d_1$ between the detected object and the vehicle 20 as well as specific characteristics of the detected object, e.g., size, shape, heat intensity, speed, etc. The controller 74 can then track changes in the distance $d_1$ and/or specific characteristics over time in order to classify the detected object as, for example, human, animal, vehicle, etc. This allows the controller 74 to specifically tailor adjustments to the vehicle 20 based on the classification of the object. It also allows the controller 74 to determine the closest in-path vehicle at the time and take appropriate countermeasures if necessary.

Figure 8:
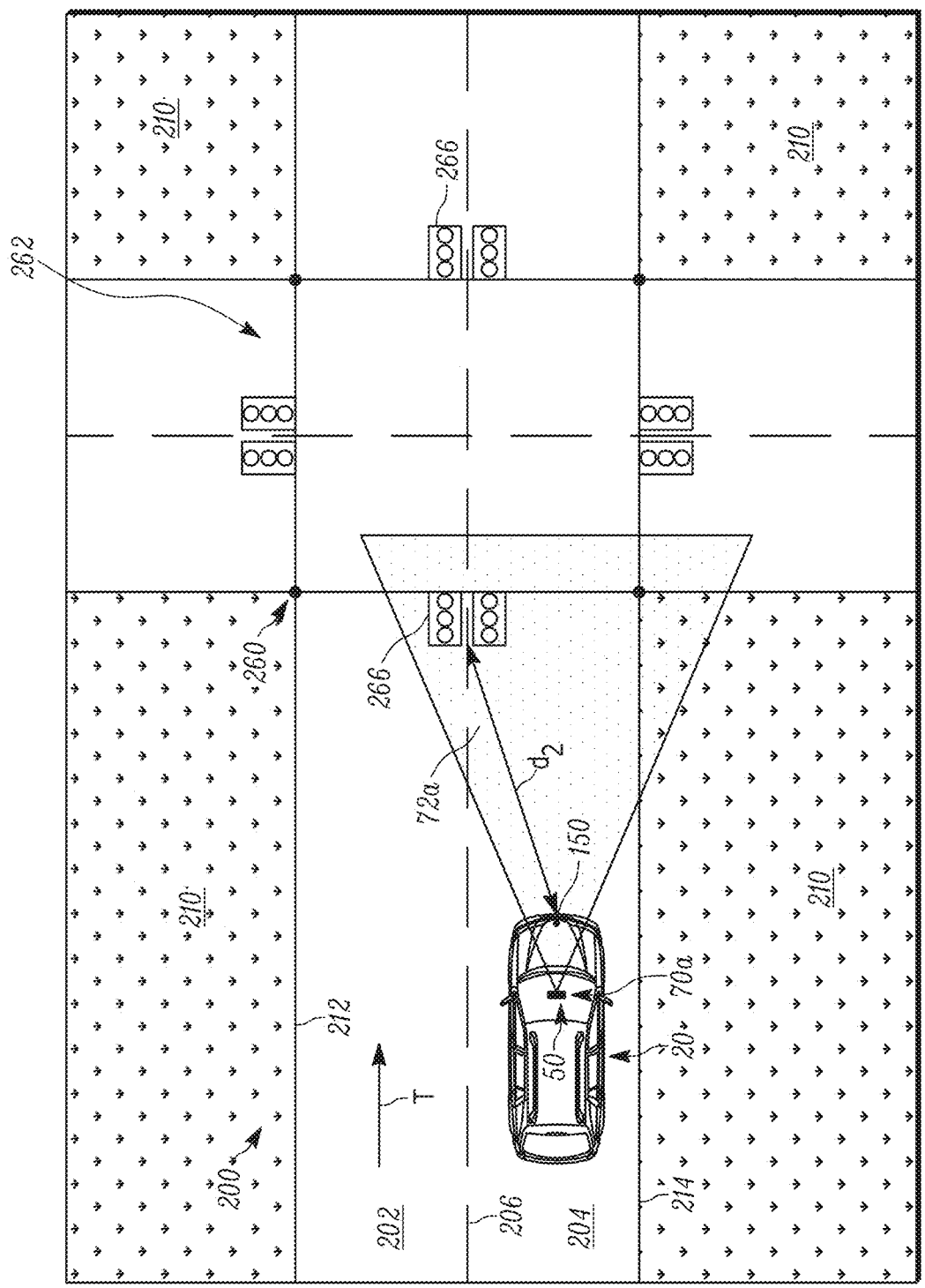
FIG. 8 is a schematic illustration of the vehicle traveling on a roadway and detecting a traffic pattern indicator in front of the vehicle within the field of view.

In another example shown in FIG. 8, the object detected within the field of view 72a is a traffic pattern indicator 266, such as a traffic light. Other example traffic pattern indicators 266 can include, but are not limited to, stop signs, yield signs, construction zone indicators, school zone indicators, police sirens, etc. In any case, the vehicle 20 travels in the direction T along the roadway 200. Another roadway 262 extends transverse to the roadway 200 and intersects the roadway 200 at an intersection 260. As shown, traffic lights 266 are suspended above the roadways 200, 262 at the intersection 260.

As the vehicle 20 approaches the intersection 260, the controller 74 continuously receives images from both cameras 90, 92 in the imaging element 70a as well as signals from the sensors 140, 170. The controller 74 relies on the composite images 240 to identify when a traffic light 266 is within the field of view 72a and what the color of the light is based on sensed light and/or heat emanating from the currently activated light. The controller 74 can control vehicle systems, when appropriate, in response to detecting the traffic light 266. For example, the controller can actuate the brake actuator 110 based on detecting a red traffic light 266, the distance between the vehicle 20 and the traffic light, and the vehicle speed. The controller 74 can therefore slow the vehicle 20 down up to and including a complete stop before the intersection 260 if a red light is detected. The controller 74 can take similar steps in response to a detected stop sign, school zone, construction zone, etc.

Figure 9:
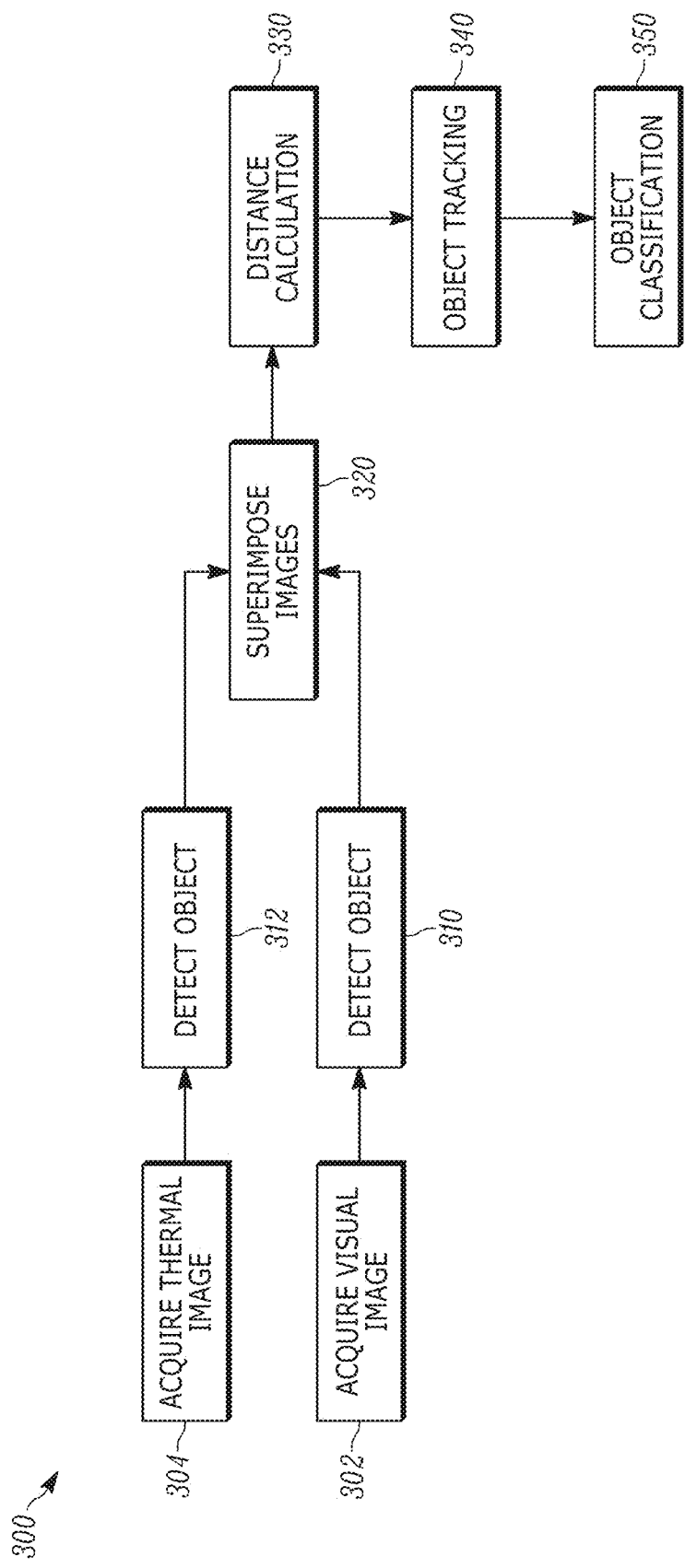
FIG. 9 is a flow chart illustrating a method of assisting a vehicle.

FIG. 9 illustrates an example method 300 of operating the assist system 50. At step 302, the controller 74 acquires a visual image 220 from the visual camera 90. At step 304, the controller 74 acquires a thermal image 230 from the thermal camera 92. At step 310, the controller 74 uses, for example, neural network shape detection analysis to detect an object in the visual image 220. At step 312, the controller 74 uses, for example, fuzzy system shape detection analysis to detect an object in the thermal image 230. At step 320, the controller 74 superimposes the thermal image 230 onto the visual image 220 to form the composite image 240. The transparency of the thermal image 230 is adjusted based on the sensed weather and environmental conditions prior to superimposing the thermal image onto the visual image 220.

At step 330, the controller 74 determines the distance $d_1$ between the vehicle 20 and the detected object. At step 340, the controller 74 uses a tracking algorithm to track the detected object. At step 350, the controller 74 classifies the detected object. The information obtained and determined by the controller 74 during the outlined steps can be used to adjust the direction of travel T of the vehicle 20, e.g., to perform lane keep assistance or evade the detected object, and/or adjust the speed of the vehicle. It will be appreciated that the same method 300 can be performed on any number of images 220, 230 acquired by the controller 74 from the respective cameras 90, 92. In other words, the image acquisition, manipulation, and analysis described herein can be performed one pair of images 220, 230 or continuously performed on multiple pairs of images to enable real-time surveillance and feedback of the vehicle 20 surroundings to the controller 74.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method for assisting operation of a vehicle traveling on a roadway, comprising:
   acquiring a visual image around the vehicle with at least one visual camera having a field of view;
   acquiring a thermal image around the vehicle with at least one thermal camera having the field of view;
   superimposing the thermal image over the visual image to produce a composite image;
   detecting an object in the composite image;
   adjusting at least one of a direction of travel and speed of the vehicle in response to detecting the object;
   sensing weather conditions and lighting conditions in the field of view;
   assigning a first visibility score to the visual image based on the sensed weather conditions;
   assigning a second visibility score to the visual image based on the sensed lighting conditions;
   combining the first and second visibility scores into an aggregate visibility score; and
   adjusting the transparency of thermal image based on the aggregate visibility score prior to superimposing the thermal image onto the visual image.

2. The method of claim 1, wherein the step of combining the first and second visibility scores comprises calculating a weighted average of the first and second visibility scores to determine the aggregate visibility score.

3. The method of claim 1 further comprising:
   detecting lane lines of the roadway with the composite image; and
   autonomously performing lane keep assistance in response to detecting the lane lines.

4. The method of claim 1 further comprising:
   detecting an object on the roadway with the composite image; and
   autonomously braking the vehicle in response to detecting the object.

5. The method of claim 1 further comprising:
   detecting a traffic pattern indicator along the roadway with the composite image; and
   autonomously braking the vehicle in response to detecting the traffic pattern indicator.

6. A vehicle assist system for a host vehicle traveling on a roadway, comprising:
   a visual camera for acquiring a visual image around the host vehicle in a field of view;
   a thermal camera for acquiring a thermal image around the host vehicle in the field of view;
   a controller connected to the visual camera and the thermal camera and configured to superimpose the thermal image onto the visual image to form a composite image for detecting an object within the field of view and adjusting at least one of a direction of travel and speed of the vehicle in response to detecting the object; and
   a rain sensor connected to the controller for detecting precipitation within the field of view, the controller being configured to adjust a transparency of the thermal image in response to the amount of precipitation detected by the rain sensor within the field of view before superimposing the thermal image onto the visual image.

7. The vehicle assist system of claim 6 further comprising a light sensor connected to the controller for detecting light intensity in the field of view, the controller being configured to adjust a transparency of the thermal image in response to the light intensity detected by the light sensor within the field of view before superimposing the thermal image onto the visual image.

8. The vehicle assist system of claim 6, wherein the controller is configured to perform at least one of lane keep assistance and braking in response to detecting the object.

* * * * *